J. BROWN.
FLYING MACHINE.
APPLICATION FILED OCT. 6, 1910.
1,034,578.
Patented Aug. 6, 1912.
5 SHEETS—SHEET 1.
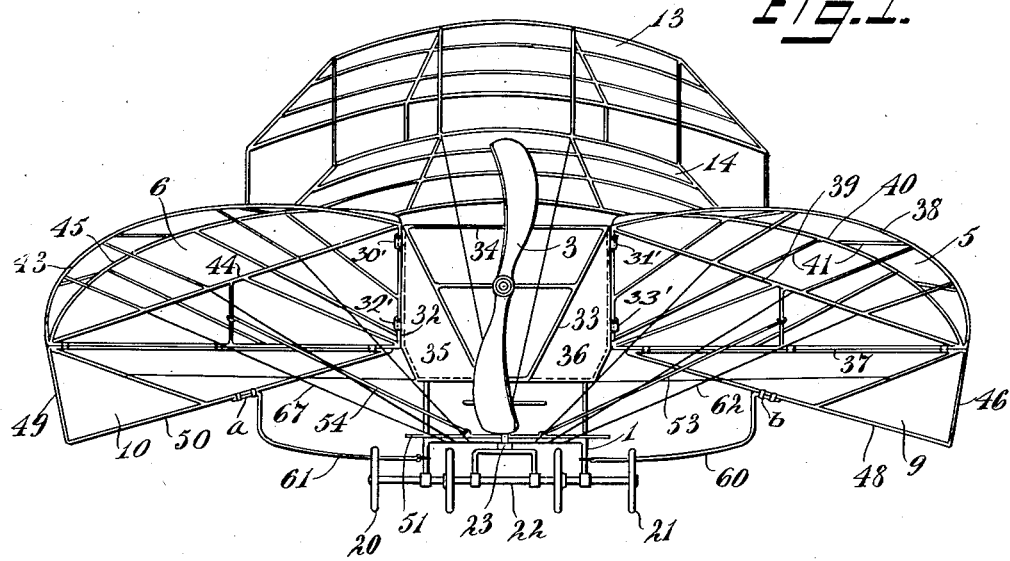
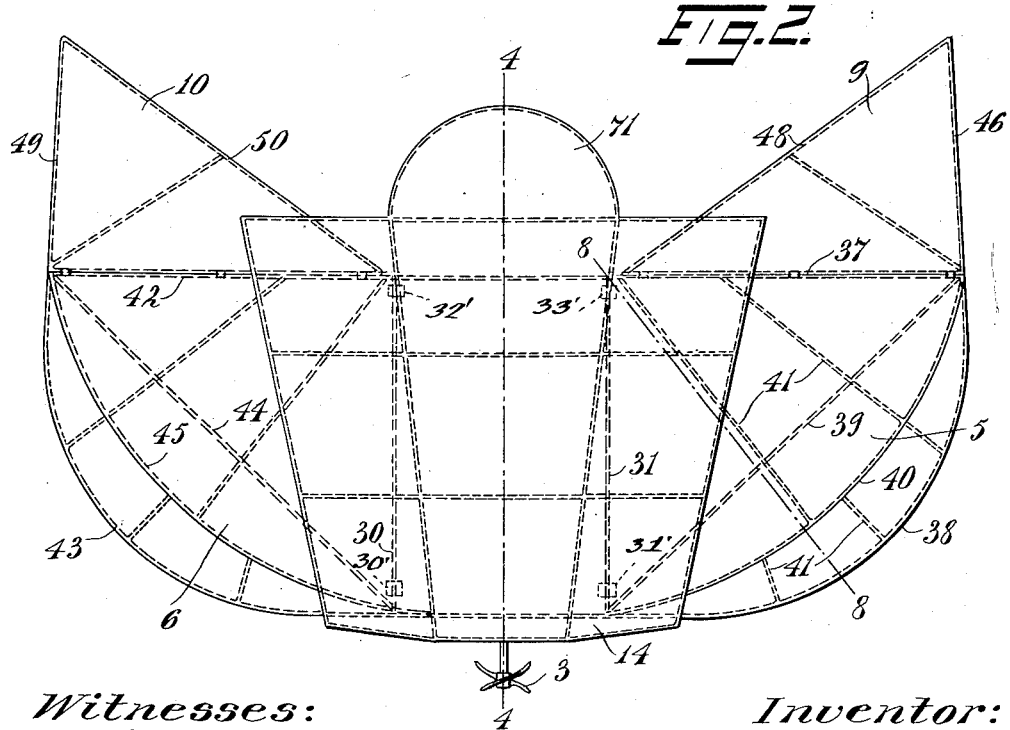
Witnesses:
Inventor:
Julius Brown,
By his Attorney,

J. BROWN.
FLYING MACHINE.
APPLICATION FILED OCT. 6, 1910.

1,034,578.

Patented Aug. 6, 1912

5 SHEETS—SHEET 2.

Witnesses:
L. C. Badeau.
H. D. Penney

Inventor:
Julius Brown,
By his Attorney, F. H. Richards.

J. BROWN.
FLYING MACHINE.
APPLICATION FILED OCT. 6, 1910.

1,034,578.

Patented Aug. 6, 1912.

5 SHEETS—SHEET 3.

Witnesses:
L. C. Badeau.
H. D. Penney.

Inventor:
Julius Brown,
By his Attorney, F. H. Richards.

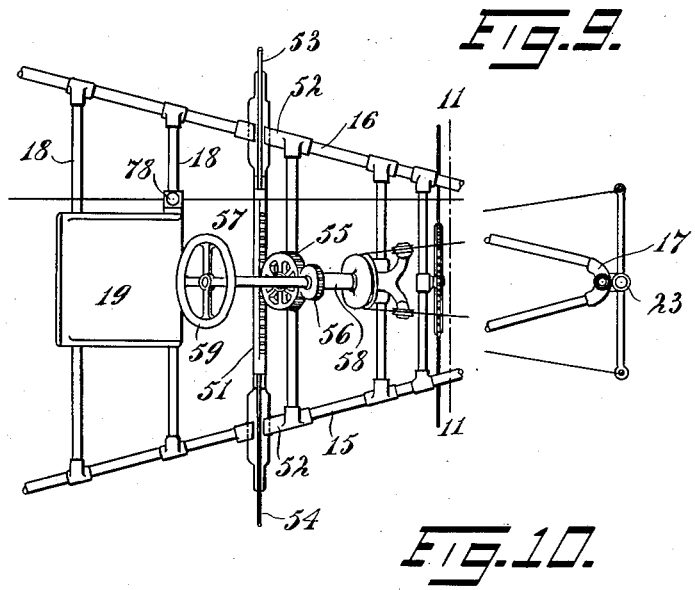
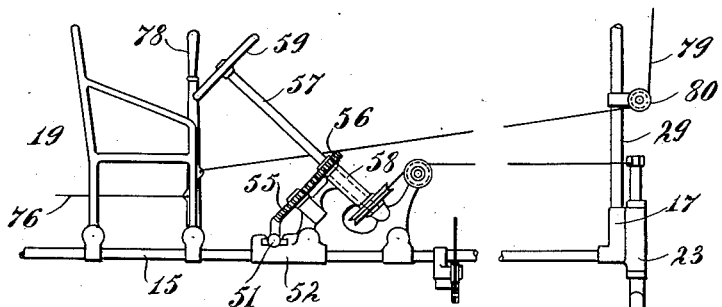
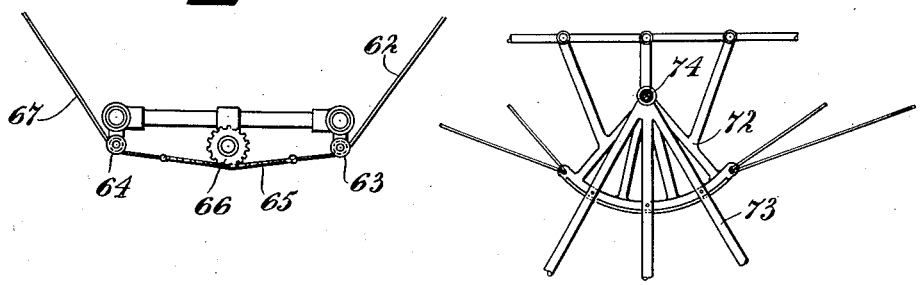

J. BROWN.
FLYING MACHINE.
APPLICATION FILED OCT. 6, 1910.

1,034,578.

Patented Aug. 6, 1912.
5 SHEETS—SHEET 5.

Witnesses:
L. C. Badeau.
H. D. Penney.

Inventor:
Julius Brown,
By his Attorney,
F. A. Richards.

UNITED STATES PATENT OFFICE.

JULIUS BROWN, OF PEEKSKILL, NEW YORK.

FLYING-MACHINE.

1,034,578.  Specification of Letters Patent.  Patented Aug. 6, 1912.

Application filed October 6, 1910. Serial No. 585,578.

*To all whom it may concern:*

Be it known that I, JULIUS BROWN, a subject of the Emperor of Germany, residing in Peekskill, in the county of Westchester and State of New York, have invented certain new and useful Improvements in Flying-Machines, of which the following is a specification.

The object of this invention is to provide in an airship of the character generally known as heavier than air machines, that operate on the principle of aeroplanes, an arrangement of planes or wing members on each side that are shiftable up and down on axes extending longitudinally, and which can be shifted in opposite directions, whereby to control the steering of the vessel to one side or to the other in its forward movement.

A further object is to provide planes to the rear of the wing members that are shiftable relative to the wings to vary their angle therewith, and which planes are shifted simultaneously with the wing members.

Another object of the invention is to provide an additional surface or plane member, located above the said wings and above the intermediate portion of the airship, acting somewhat on the principle of the biplane; and which member is preferably adjustable relative to the wing members, whereby to control the upward or downward advance movement of the vessel.

Figure 3:
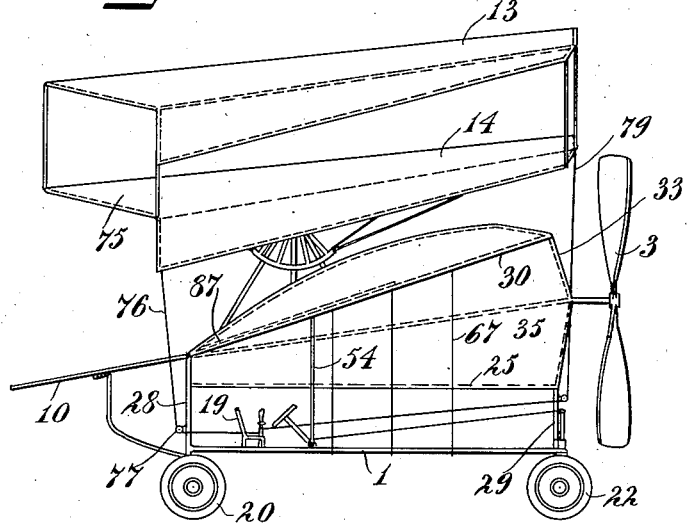
Figure 4:
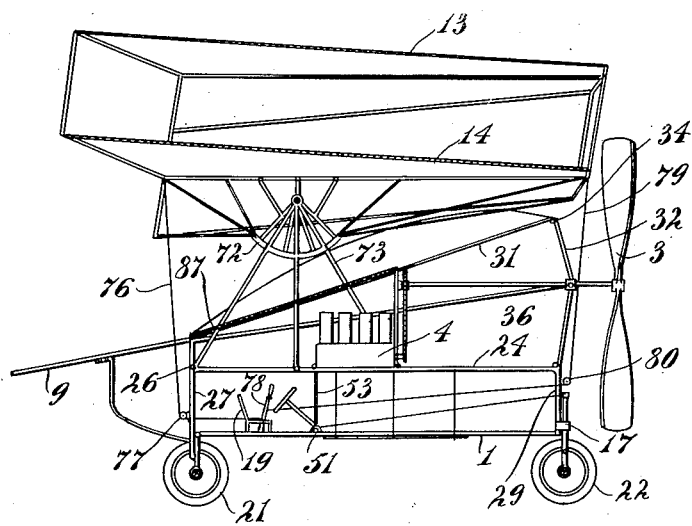
Figure 6:
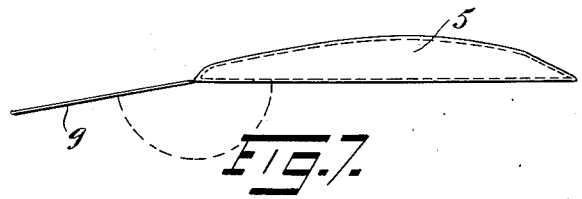
Figure 7:
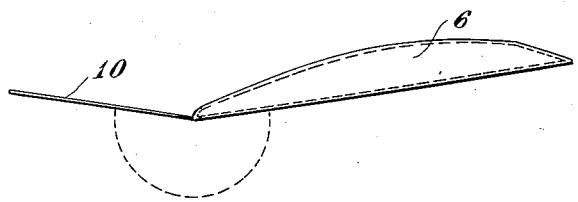
Figure 5:
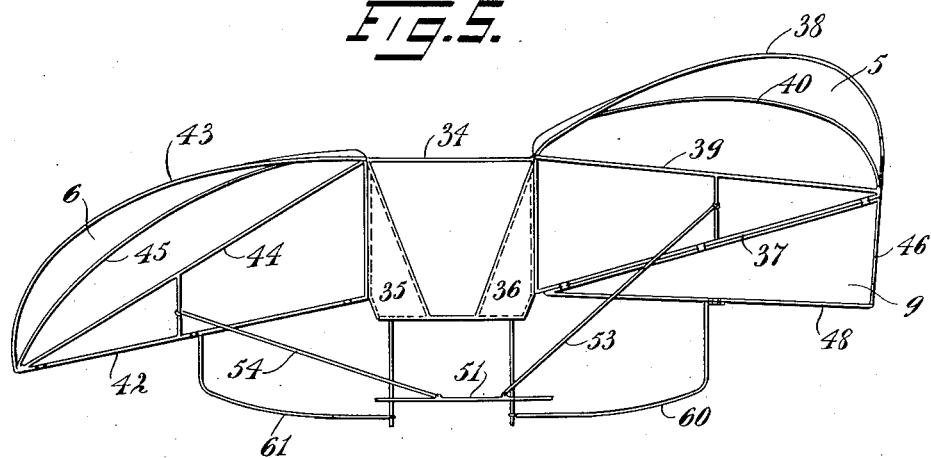
Figure 8:
Figure 13:
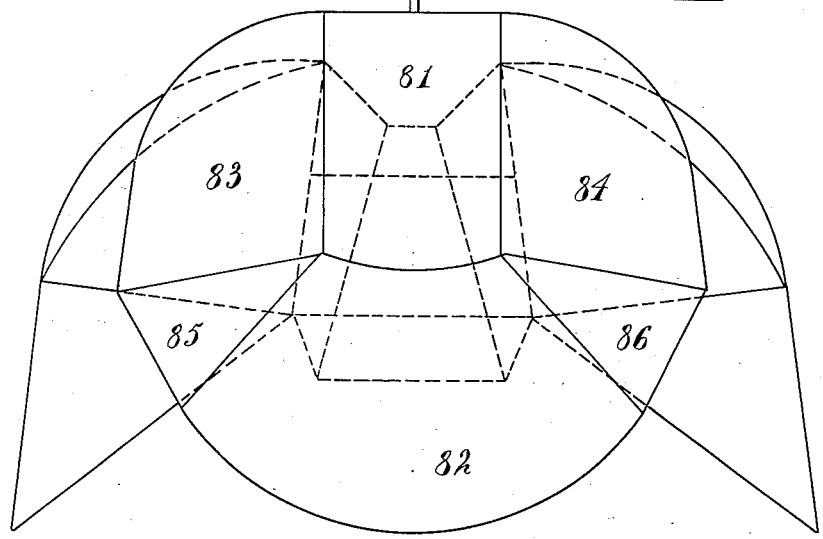
Figure 14:
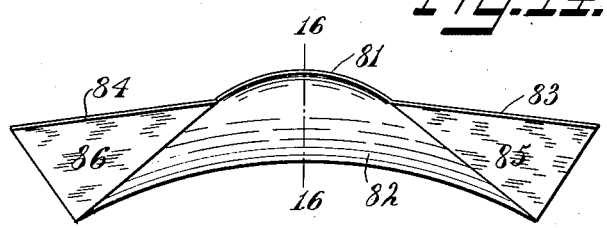
Figure 15:
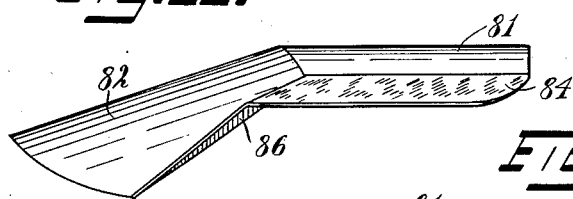
Figure 16:
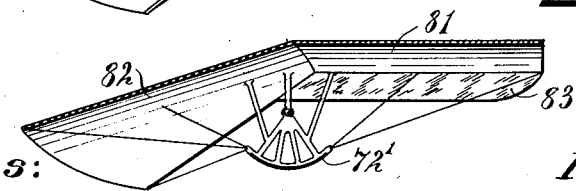

In the accompanying drawings, representing embodiments of my invention, Figure 1 is a front elevation. Fig. 2 is a plan view. Fig. 3 is a side elevation. Fig. 4 is a vertical section on the line 4—4 of Fig. 2. Fig. 5 is a front view showing the position of the wings when shifted to steer the craft to one side, one wing being elevated and the other depressed. Fig. 6 shows the relation of the depressed wing with its rear extension, and Fig. 7 shows the relation of the elevated wing with its rear extension. Fig. 8 is a section on the line 8—8 of Fig. 2. Fig. 9 is a partial plan view showing the operating mechanism. Fig. 10 is a side elevation of the parts shown in Fig. 9. Fig. 11 is a front elevation as seen on the line 11 of Fig. 9. Fig. 12 shows enlarged the supporting means for the top plane. Fig. 13 is a plan view showing another form of top plane from that shown in Fig. 2. Fig. 14 is a front view of the top plane. Fig. 15 is a side elevation of the same; and Fig. 16 is a vertical section on the line 16—16, shown in Fig. 14.

The airship is shown as provided with a body frame denoted generally by 1 that serves to support the propelling means, such as a bladed propeller 3, that may be operated from a suitable motor 4; the propeller being shown at the front. On the body frame are pivotally mounted two wing members, one on each side, that are pivoted on axes extending longitudinally and which axes are preferably separated, and located on opposite sides of the frame or car portion. Two wing members, 5 and 6 are shown that swing on longitudinal axes and on the frame. Means are provided for swinging the wing members on these axes from the frame, and which will cause them to move in opposite directions, one being elevated as the other is depressed, from the normal position, in which they make an equal angle with the frame. To the rear of these wings are arranged planes or extensions 9 and 10, that are preferably continuations of these wings, and are arranged to swing on a transverse axis that is preferably the rear edge of the wing. These extensions are shown as arranged to be swung by the said shifting of the wings, whereby their angle with the wing is changed from one side to the other, as indicated in Figs. 6 and 7.

At the top a plane member is provided, located a short distance above the frame of the car, and extending laterally to cover preferably a portion only of the wings, but located above very little if any of the extensions. This top plane 14 may be provided, if desired with another top plane 13, just above it, as shown in Fig. 4. One or both of these planes are supported from the frame, and swung on a horizontal transverse axis; and controlling means are provided on the car to shift these planes to vary their angle of incidence with the air.

The body frame is shown as composed of side portions 15 and 16 that are secured to a head 17, at the front, and diverge rearward, being connected by cross bars 18 at several places. This constitutes the floor member proper of the car, on which a seat 19 may be provided for the operator. At the rear, wheels 20 and 21 are provided at the extremities of the side members. A pair of wheels or truck 22 is shown at the front swinging on a head 23 for steering the craft when it runs along the ground at the start of the flight. A short distance above the frame members 16 and 17 are portions 24 and 25, parallel to the said members and connected at their front while at the rear is a cross bar 26, and vertical posts 27 and 28. A vertical post 29 is also provided at the front to support these portions. Higher up on the frame or body member are longitudinal bars 30 and 31 that are supported with their front ends elevated higher than their rear ends, but extending substantially parallel or equidistant. These two bars, 30 and 31 constitute the axes of the wing members 5 and 6, and have their front ends supported by inclined posts 32 and 33, and connected at the top by cross bar 34. On one side a fabric or other material is attached between the bar 30 and the longitudinal bar 25, forming a plane 35; while on the opposite side a plane 36 is formed by suitable material stretched between the bar 31 and the longitudinal bar 24. These planes it will be observed are inclined to the vertical, and since the lower bars of the plane diverge rearwardly, the planes will tend to engage the air in the forward movement of the ship and move the air outward. These two planes form practically a downward continuation of the wings and will greatly assist in sustaining the car, by tending to retain the air under the wings. This is assisted by the particular shape of the wings. One side of the wing 5 is formed by the bar 31 and the rear portion of the wing is formed by a lateral bar 37 substantially at right angles to the bar 31. A curved bar 38 extends from the outer end of the bar 37 to the front end of the bar 31, substantially in the form of a quadrant. These three members form the support for the fabric of this plane 5, that is somewhat quadrant shaped. This plane is preferably dished or made concave on its lower face. A straight reinforcing strut 39 extends between the extremities of the bars 31 and 37, and a bar 40 is curved upwardly in a higher plane than the said strut 39 between its extremities and supported by struts 41, in this curved manner by the said bar 40, meeting and joining the ends of the strut 39. While this curvature is shown in Fig. 1, the said figure shows the frame-work without the planes whereas in Fig. 2 the planes are shown as covering the said frame-work, the same being dotted therein and the upward curvature, previously mentioned, does not show. On the other side, the wing 6 is supported by a transverse bar 42, extending outward from the end of the bar 30, and connected by a curved bar 43 with the front end of the bar 30. This wing has a straight bar 44, and a curved bar 45 similar to the other wing, whereby it is given a dished form.

The wing extension 9 is formed by a rearwardly extending bar 46 from the outer end of the cross bar 37, and a diagonal bar 48 running from the inner end of the bar 37 to the rear of the bar 46; hence being triangular in shape. On the other side the wing 10 is formed by a longitudinal bar 49 and a diagonal bar 50 similar to the extension 9. These wings swing on the axis of the bars 37 and 42. They are preferably supported to be practically stationary relative to the frame at their diagonal bars 48 and 50, whereby the swinging up and down of the wings 5 and 6 on their axes 31 and 30 will cause the extensions to change their angle relative to the planes of the wings, as indicated in Figs. 6 and 7, and by this means the operation of swinging the wings 5 and 6 up and down will cause this change in the positions of the extensions, relative to their respective wings.

Suitable means are provided adjacent the operator on the platform, for shifting the wings and their extensions. A rack bar 51 is suitably guided in brackets 52, and is connected with the side wings by rods 53 and 54, respectively. A gear 55 meshes with the rack bar 51, which gear is engaged by a smaller gear 56 on a post 57, turning in a support 58 on the frame; the post being controlled by a hand wheel 59. By this means the rack is reciprocated and the rods 53 and 54 will serve to depress one wing as the other is elevated as indicated in Fig. 5. The shifting of these wings will cause the rear bars 37 and 42 of the wings to swing up and down. But as the rear members 48 and 50 of the wings are held substantially stationary by braces 60 and 61, extending from the lower portion of the frame to the bars 48 and 50, the wing extensions will practically swing on their bars 48 and 50 as axes, and will change their angle relative to the wings, from one side to the other, as indicated in Figs. 6 and 7. The rear members 48 and 50 are hingedly mounted to the supports 60 and 61 as indicated in Fig. 1 at $a$ and $b$, and while the said members 48 and 50 form substantially the axes of the movement they are more or less resiliently held by the supporting members 60 and 61, thus allowing a slight compensation for the shortening or extending of the angle formed between members 50, 48, and members 30, 31, respectively. Additional steadying means are also provided for the wing members, shown in the form of a cable 62, extending from the wing 5 around pulley 63, and connected to a chain 65 passing around gear 66. A cable 67 is secured to the other end of the chain 65 and passes around a pulley 64 which cable is secured to the other wing 6. A second plane member or wing member is provided above the said wings, making the car a biplane.

In Fig. 2 a plane 14 is shown somewhat in the outline of a keystone, but having a semi-circular extension 71 at the rear. This plane is located above the middle portion of the car, and extends over only a small portion of the side wings. This top plane is supported to be adjusted or shifted on a horizontal transverse axis, so that it will meet the air as the craft is propelled forward, at different angles, and its angle relative to that of the wings can be varied. This top plane 14 is preferably curved transversely as indicated in Fig. 1. On each side of this top plane at its lower portion, is secured an arc shaped brace 72, that is pivoted to a V-shaped standard 73, extending upwardly from the body frame on each side. A pivot 74 at the top of the frame connects these braces on each side, whereby the top frame can be tilted on a horizontal axis. If desired, this top plane may be made double and is shown in Figs. 1 and 3 provided with a second plane 13, attached to and above the top plane 14 and spaced apart therefrom. To swing the top plane on its axis, a cable 76 runs from the rear of the plane down around the pulley 77 and then is secured to a lever 78 pivoted adjacent the seat 19 of the operator. At the front a cable 79 fast to the top plane, runs down around the guide pulley 80 and then extends rearward to have its extremities secured to the lever 78. It will be understood that swinging this lever will pull down on one cable and at the same time release the other cable, permitting the tilting of the top plane.

In Figs. 13–16 is shown another form of the top plane. This member is shown as comprising a curved forward portion 81 having at the rear a curved portion in the form of a conical segment 82 whose apex would be forward of the plane, and the rear of this conical portion is rounded off as shown in Fig. 13. On each side of the plane portion 81 is a flat portion, 83 and 84, and between the rear of these flat portions and the sides of the conical portion 82 are inclined flat portions 85 and 86. Fig. 13 shows the position of this top plane relative to the ship, from which it will be seen that about two-thirds of the wings are covered by this top plane, but that very little of the rear extensions of the wings are covered by the rear conical portion of the top plane. This plane is supported by frames 72' on each side.

A fabric or other surface is stretched between the side bars 30 and 31 to have an additional sustaining effect on the ship. In the operation of the airship, as the wing members are inclined or depressed rearwardly, when the craft is driven forward by its propeller, the wings will strike the air at a slight angle of incidence that will tend to elevate the ship or propel it directly forward. The upward or downward advanced movement of the craft is controlled by adjusting the angle of the top plane whereby its angle of incidence is changed by the operator on the ship. The curved or dished shape of the wings, together with the action of the inclined planes extending downward from the axis of the wings has a kind of cushioning effect, tending to retain some of the air, rather than permit it to pass directly through or beyond the craft.

When it is desired to steer the ship to either side, the wheel is turned, and one wing will be depressed, while the other wing is elevated. This latter movement will also change the angle of the wing extensions relative to the wings. The wing on the side that is elevated, thereby causing its extension or tail to be depressed, will have a greater retarding action on the air than the other side, whereby the ship will turn toward that side as long as this position is maintained. But this shifting of the wings will only affect the forward movement, and will not have any appreciable effect on the sustaining or elevating function of the wings; for the reason that the same area of plane surface is effective against the falling movement of the ship through the air. Furthermore, these wings will have the effect of causing the ship to sail on an even keel and prevent tipping sidewise through the air.

Having thus described my invention, I claim:

1. In an airship, the combination of a body frame, a pair of wing members on each side of the body hinged thereto on an axis extending longitudinally, and projecting outward from the said axis, and controlling means on the frame connected with the wing members for shifting them up and down, each of the wings having an extension at the rear hinged to swing on a transverse axis.

2. In an airship, the combination of a body frame, a pair of dished wing members on each side of the body hinged thereto on an axis extending longitudinally, and projecting outward from the said axis, controlling means on the frame connected with the wing members for shifting them up and down, each of the wings having an extension at the rear hinged to swing on a transverse axis.

3. In an airship, the combination of a body frame, a pair of wing members on each side of the body hinged thereto on a longitudinal axis inclined downward to the rear, and projecting outward from the axis, and controlling means on the frame connected with the wing members for swinging them up and down, each of the wings having an extension at the rear hinged to swing on a transverse axis.

4. In an airship, the combination of a body frame, a pair of wing members on each side of the body hinged thereto on an axis extending longitudinally, and projecting outward from the said axis, and controlling means on the frame connected with the wing members for shifting them up and down, each of the wings having an extension at the rear hinged to swing on a transverse axis, with the rear edge of the extension running diagonally outward from the inner end of the axis.

5. In an airship, the combination of a body frame, a pair of wing members on each side of the body hinged thereto on an axis extending longitudinally, and projecting outward from the said axis, and controlling means on the frame connected with the wing members for swinging them up and down, each of the wings having an extension at the rear hinged to swing on a transverse axis, said extensions being triangular with one straight side extending longitudinally rearward from the outer portion of the wing member with the rear edge of the extension running diagonally outward from the inner end of the axis, and means for swinging the extension planes.

6. In an airship, the combination of a body frame, a pair of wing members on each side of the body hinged thereto on an axis extending longitudinally, and projecting outward from the said axis, and controlling means on the frame connected with the wing members for swinging them up and down, each of the wings having an extension at the rear hinged to swing on a transverse axis, said extensions being triangular with one straight side extending longitudinally rearward from the outer portion of the wing member with the rear edge of the extension running on a transverse axis, a brace connected with the frame and with the extension planes whereby the swinging of the side wing will shift the pivotal axis of the extension planes and change their angle relative to the side wings.

7. In an airship, the combination of a body frame, a pair of wing members on each side of the body hinged thereto on an axis extending longitudinally therefrom, and projecting outward from the wing members for shifting them up and down, each of the wings having an extension at the rear hinged to swing on a transverse axis, and a brace connected with the frame and with the extension planes whereby the swinging of the side wings will shift the pivotal axis of the extension planes and change their angle relative to the side wings.

8. In an airship, the combination of a body frame, a pair of wing members on each side of the body hinged thereto on an axis extending longitudinally, and projecting outward from said axis, controlling means on the frame connected with the wing members for swinging them up and down, and a plane connected with the frame member and supported at the middle portion of the car above the said wings, the latter plane having its rear portion curved in the form of a conical segment, with the apex forward and having at each side plane portions.

9. In an airship, the combination of a body frame, a pair of wing members on each side of the body hinged thereto on an axis extending longitudinally, and projecting outward from the said axis, controlling means on the frame connected with the wing members for swinging them up and down, a plane connected with the frame member and supported at the middle portion of the car above the said wings, the said top plane having its rear portion curved in the form of a conical segment, with the apex forward, and having at each side plane portions at the front lying in substantially the same plane, and a small plane on each side extending downward from said planes to said conical segment.

10. In an airship, the combination of a body frame, a pair of wing members on each side of the body hinged thereto on an axis extending longitudinally, and projecting outward from the said axis, extension members thereon, controlling means on the frame connected with the wing members for shifting them up and down, said connections being arranged to shift one wing downward as the other is shifted upward, a plane extending across between the axes of the wings, a brace connected with the frame and with the extension planes whereby the swinging of the side wings will shift the pivotal axis of the extension planes and change their angle relative to the side wings.

11. In an airship, the combination of a body frame, a pair of wing members on each side of the body hinged thereto on an axis extending longitudinally, and projecting outward from the said axis, controlling means on the frame connected with the wing members for swinging them up and down, each of the wings having an extension at the rear hinged to swing on a transverse axis, said extensions being triangular with one straight side extending longitudinally rearward from the outer portion of the wing member with the rear edge of the extension running diagonally outward from the inner end of the axis, means for swinging the extension planes, and a plane connected with the frame member and supported at the middle portion of the car above the said wings, the latter plane having its rear portion curved in the form of a conical segment with the apex forward and having at each side plane portions.

JULIUS BROWN.

Witnesses:
 FRED. J. DOLE,
 W. H. REID.